US011016028B2

(12) United States Patent
Smith et al.

(10) Patent No.: US 11,016,028 B2
(45) Date of Patent: May 25, 2021

(54) PARALLEL IMAGING SYSTEM

(71) Applicant: INDEVR, INC., Boulder, CO (US)

(72) Inventors: Eric Smith, Boulder, CO (US); Robert Stoughton, Boulder, CO (US); Kathy L. Rowlen, Boulder, CO (US)

(73) Assignee: INDEVR, INC., Boulder, CO (US)

( * ) Notice: Subject to any disclaimer, the term of this patent is extended or adjusted under 35 U.S.C. 154(b) by 16 days.

(21) Appl. No.: 16/478,391

(22) PCT Filed: Jan. 19, 2018

(86) PCT No.: PCT/US2018/014524
§ 371 (c)(1),
(2) Date: Jul. 16, 2019

(87) PCT Pub. No.: WO2018/136797
PCT Pub. Date: Jul. 26, 2018

(65) Prior Publication Data
US 2019/0376897 A1 Dec. 12, 2019

Related U.S. Application Data

(60) Provisional application No. 62/448,228, filed on Jan. 19, 2017.

(51) Int. Cl.
*G01N 21/64* (2006.01)
*G01N 21/25* (2006.01)

(52) U.S. Cl.
CPC ....... *G01N 21/6452* (2013.01); *G01N 21/253* (2013.01); *G01N 2201/062* (2013.01);
(Continued)

(58) Field of Classification Search
CPC ............. G01N 21/253; G01N 21/6452; G01N 2201/062; G01N 2201/064; G01N 2201/0634; G06K 9/32
(Continued)

(56) References Cited

U.S. PATENT DOCUMENTS 4,849,820 A 7/1989 Suzuki et al.
8,414,830 B2 * 4/2013 Jiang ...................... C12M 23/50
422/82.05
(Continued)

FOREIGN PATENT DOCUMENTS

CN 103969188 A 8/2014
WO WO 2013/144359 A2 10/2013
WO WO 2015/179574 A1 11/2015

OTHER PUBLICATIONS

BioTek Instruments Catalog (2015) "BioTek Microplate Instrumentation," 70 pages.
(Continued)

*Primary Examiner* — Daniel G Mariam
(74) *Attorney, Agent, or Firm* — Leydig, Voit & Mayer, Ltd.

(57) ABSTRACT

Provided herein are enhanced imaging techniques which allow for the use of multiple optical sensors, each of which corresponds to only a portion of an array, including utilizing individual sensors for each individual well of a multi-well plate. The provided systems and methods may reduce the amount of time to perform optical analysis of an array, reduce the amount of moving parts or mechanical devices required to perform optical analysis and/or reduce the amount of space between the sensors and the array being analyzed resulting in more compact, efficient optical analyzers.

18 Claims, 8 Drawing Sheets

(52) U.S. Cl.
CPC .................. *G01N 2201/064* (2013.01); *G01N 2201/0634* (2013.01)

(58) Field of Classification Search
USPC ................................................ 382/128, 284
See application file for complete search history.

(56) References Cited

U.S. PATENT DOCUMENTS

| | | | |
|---|---|---|---|
| 8,808,627 | B2 | 8/2014 | Wohlstadter et al. |
| 9,360,433 | B1 | 6/2016 | Rowlen et al. |
| 10,261,081 | B2 | 4/2019 | Rowlen |
| 10,281,678 | B2* | 5/2019 | Chamberlin ......... G01N 35/028 |
| 10,732,180 | B2 | 8/2020 | Rowlen et al. |
| 2006/0057557 | A1* | 3/2006 | Deutsch ................ G06T 7/0012 |
| | | | 435/4 |
| 2006/0152727 | A1* | 7/2006 | Bickmore, Jr. .... G01N 21/6452 |
| | | | 356/417 |
| 2007/0228306 | A1* | 10/2007 | Gannon ............. G06K 7/10722 |
| | | | 250/555 |
| 2008/0297774 | A1* | 12/2008 | Jiang .................... G01N 21/253 |
| | | | 356/123 |
| 2010/0157086 | A1* | 6/2010 | Segale ............... G01N 21/6458 |
| | | | 348/222.1 |
| 2015/0152489 | A1* | 6/2015 | Castro Signoret ........................... |
| | | | G01N 33/54313 |
| | | | 435/5 |
| 2015/0330892 | A1* | 11/2015 | Cerignoli ........... G01N 21/6408 |
| | | | 348/79 |
| 2015/0362476 | A1* | 12/2015 | Clements ............... G01N 21/01 |
| | | | 506/10 |
| 2016/0216208 | A1* | 7/2016 | Kim ..................... H04N 5/2258 |
| 2018/0187273 | A1 | 7/2018 | Taylor et al. |
| 2018/0330056 | A1 | 11/2018 | Stoughton et al. |
| 2019/0003979 | A1 | 1/2019 | Rowlen et al. |
| 2020/0011867 | A1 | 1/2020 | Rowlen |
| 2020/0018749 | A1 | 1/2020 | Smolak et al. |
| 2020/0158729 | A1 | 5/2020 | Rowlen et al. |

OTHER PUBLICATIONS

Couture et al. (publicly available Jan. 2016) "96-Well Plasmonic Sensing with Nanohole Arrays," ACS Sens. (Mar. 2016) 1(3): 287-294.

PCT International Search Report and Written Opinion issued in PCT/US2018/014524 dated Mar. 23, 2018, 15 pages.

\* cited by examiner

Four of the same color LED.

PARALLEL IMAGING SYSTEM

CROSS-REFERENCE TO RELATED APPLICATIONS

This application is a U.S. National Stage Application filed under 35 U.S.C. § 371 of International Application No. PCT/US2018/014524, filed Jan. 19, 2018. which application claims the benefit of priority from U.S. Provisional Patent Application No. 62/448,228, filed Jan. 19, 2017, each of which are incorporated herein by reference in their entireties to the extent not inconsistent therewith.

BACKGROUND OF INVENTION

Automated optical analysis has received increased attention in recent years in biotechnology. A variety of optical methods are used in biotech to accurately and efficiently make classifications or interpret results for a variety of assays. Biotech applications often involve a plurality of test samples, limited space for instrumentation and the need for reliable devices. Existing optical analysis devices often have failure modes which reduce reliability and increase calibration frequency. Thus, it is desirable in the biotech systems to provide high throughput and high reliability while requiring minimal laboratory space.

Automated optical methods may be used in an assay to analyze an array of elements to be optically addressed or a plate having a multitude of wells containing different biological materials (e.g. proteins, antibodies, viruses, organisms, etc.) or biological materials at different concentrations in order to make important classifications or determinations. Several different optical methods have been studied, including absorbance, fluorescence and computer analysis of digital images. Many of these methods have seen interest and adoption to various degrees within the biotech industry.

A wide variety of biotech applications and assays utilize arrays of elements to be optically addressed or imaged, such as the wells of a multi-well plate, a plurality of tubes, a plurality of discrete areas on an alternative substrate such as a paper card or membrane, for applications including, for example, agglutination reactions, enzyme-linked immunosorbent assays (ELISA), microarray assays, real-time PCR assays, $TCID_{50}$/mL or $EID_{50}$/mL assays, antibiotic susceptibility testing, microneutralization assays, and many others.

For example, agglutination reactions in multi-well plates can be used to determine virus or antibody concentration, blood type and a variety of other biological properties. In these types of analyses, a sample (such as a pathogen, a virus or a tissue) is progressively diluted by various factors and placed in wells in which the dilution factor is noted. Then additional materials, including antibodies or antigens (which can also be distributed based on concentration), are added to the wells such that an agglutination reaction may occur in wells having sufficient concentrations. The agglutination reaction causes the contents of the well to form larger, complex structures which are less prone to settling in the bottom of the well and more likely to remain in suspension, resulting in visual differences between those wells in which agglutination has occurred and those in which it has not. Through this method an analyst can determine pathogen type, pathogen concentration (often expressed as a titer), the presence or absence of a pathogen, the efficacy of an antibody or antibiotic and a whole host of other important biological properties about the system under investigation.

While humans have typically analyzed the resulting plates for agglutination based assays by eye, the added efficiency, accuracy and reduced cost have led to efforts to automate these processes and analysis. For example, U.S. Pat. No. 9,360,433, which is hereby incorporated by reference in its entirety, uses optical density measurements in a multi-well plate to automatically determine if agglutination has occurred in each of the wells.

As another example, a fluorescent microarray, which can be conducted using a range of binding agents including DNA or RNA, may be contacted with a biological sample. The binding agents will bind or react with certain portions of the DNA or RNA. The microarray can then be analyzed to reveal certain characteristics of the DNA or RNA, including source organism, the presence or absence of genetic markers, the presence or absence of mutations, adaptations or even establish a full DNA sequence or genome. In pathogen analysis, this process may determine type, subtype, genotype, lineage or other important properties relevant to researchers and pathologists. In some applications, a plurality of microarrays may be arranged as an array. For example, an array of microarrays may be deposited in the various wells of a microwell plate, or in discrete areas of an alternative substrate where each microarray may or may not be surrounded by a gasket material to isolate it from surrounding microarrays Current automated systems used for multi-well plate and other imaging applications typically use a single optical sensor, such as a digital camera, to analyze the entirety of the array (that is, all wells of the plate or all elements to be imaged) by one of two methods 1) mechanically moving the sensor or the array to the various locations so that each individual well or element may be analyzed or 2) by capturing a single image containing all of the wells, elements, or areas to be analyzed. Mechanically moving the sensor or array requires additional complexity in the analysis device and is time consuming, as a large number of readings must be taken depending on the number of wells or elements in the array. Using a single image to capture all of the wells or elements at once means that a large portion of the sensor is wasted as it must be large enough to capture the entire array, including the extraneous portions such as the area in between the wells or elements. In the case of digital imaging, this means that a large portion of the camera's resolution is devoted to unanalyzed inter-well space. Further, the position of the sensor relative to the position of each of the wells or elements is not the same of each well in the plate, leading to complications in ensuring equivalency of analysis between the wells or elements.

It will be appreciated from the foregoing that there is currently a need in the art for improved systems and methods of optical analysis for biotech assays, including multi-well plate assays which allow for rapid analysis and simplification of the analysis device, including reduced moving parts and smaller size.

SUMMARY OF THE INVENTION

Provided herein are enhanced imaging techniques which allow for the use of multiple optical sensors, each of which corresponds to only a portion of an assay, including utilizing individual sensors for each individual well of a multi-well plate. The provided systems and methods may reduce the amount of time to perform optical analysis of an array, reduce the amount of moving parts or mechanical devices required perform optical analysis and/or reduce the amount of space between the sensors and the array being analyzed resulting in more compact, efficient optical analyzers. The described systems and methods provide the ability to process samples faster than existing devices, with an instrument which is more compact, and more reliable than existing devices.

The provided systems and methods further utilize optical components to provide benefits in optical sensing, image capture or optical analysis of arrays. The provided methods may utilize light sources, including light sources to provide a substantially uniform amount of light to each well, which may assist or enhance optical sensing or analysis. Further, any one or more of lens, filters, anti-reflection features and/or gaskets may be incorporated into any of the systems and methods described herein to condition the provided light to enhance either sensing or analysis of the array of interest.

In an aspect, provided is an imaging system for a multi-well plate comprising: i) a receptacle configured to receive a multi-well plate having a plurality of wells; ii) a plurality of image capture devices with each image capture device in optical alignment with an individual well, wherein each of the image capture devices is configured to capture an image of one of the wells; wherein the imaging system aggregates the plurality of captured digital images to simultaneously generate an aggregate image of the multi-well plate that includes each individual well without any moving parts. Simultaneously imaging each well reduces the amount of time required to image all of the samples, thereby increasing throughput. In some cases, such as those testing methods in which time is a factor, the ability to simultaneously image each well increases throughput compared a system which moves a camera to incrementally image individual wells, as several minutes may have passed between the first and last image. The methods and systems provided herein are compatible with a wide range of multi-well plate geometries with varying well numbers and applications. For example, the multi-well plate may be a 12-well, 24-well, 48-well or 96-well plate, and/or an enzyme-linked immunosorbent assay plate, a $TCID_{50}$/mL or $EID_{50}$/mL plate, a microarray plate, or a microneutralization plate.

Systems and methods provided herein are useful with a variety of optical sensors, each of which can be utilized in different biological analysis or identification techniques. The use of multiple optical sensors allows for the individual sensors to have lower operating requirements, such as resolution or sensitivity, than a system which relies on a single sensor. Further, the provided systems and methods may reduce the portion of the sensor which is dedicated to unanalyzed areas such as the spacing between the wells. For example, various systems and methods provided herein may have an image area that is less than 10%, less than 5% or less than 1% corresponding to inter-well space (i.e. area between wells that serves no functional well imaging purpose). Alternatively, any of the systems and methods provide, compared to a conventional single image system, a reduction of at least 50%, at least 70% or at least 95% of non-useful inter-well imaging.

In embodiments, for example, the image capture devices are selected from the group consisting of: digital cameras, charge coupled devices, active pixel sensors, complementary metal-oxide semiconductor sensors, N-type metal-oxide semiconductor sensors and a combination thereof.

Conventional imaging systems, especially single image systems, dedicate a significant amount of resolution to imaging dead space (or inter-well area) which provides no relevant diagnostic information. In contrast, the instant devices and methods allow for concentrating on only the wells themselves (or well area) and reducing the imaging of inter-well or dead space and thereby provide higher resolution images of analyzed areas or reduce the complexity and/or cost of image devices. In an embodiment, the aggregate image has an aggregate imaged area and the multi-well plate has a well area footprint and an inter-well area footprint; and the aggregate image area encompasses less than 100% of the inter-well area footprint. In embodiments, for example, the aggregate image area may encompass less than 50%, 25%, or 10% of the inter-well area footprint. In an embodiment, the total aggregate image area is within ±10%, or optionally, ±5% of the total well area footprint. In embodiments, the well area footprint is greater than or equal to 50% of a total plate footprint.

Any of the imaging systems may further comprise an analyzer in communication with the imaging system and configured to characterize the aggregate image of the plate. Depending on the application of interest, the analyzer can be selected to provide an appropriate output parameter. For example, the analyzer may characterize an agglutination parameter of an agglutination assay. The analyzer may characterize an agglutination parameter selected from the group consisting of: a titer value, concentration, genotype, phenotype, serotype, viral resistance, inhibition, presence of the agglutinating mediator; and absence of the agglutinating mediator. The analyzer may characterize a parameter of a fluorescence microarray or a parameter of an absorbance microarray.

It may also be beneficial to provide light sources in optical communication with the optical sensors and/or for digital imaging. The provided systems and methods may further provide controlled lighting environments which may be beneficial in sensing or imaging techniques and provide enhanced analysis capabilities. For example, it may be beneficial to provide light which is substantially uniform to each of the wells of a multi-well plate or a microarray. Substantially uniform light may refer to light having an intensity within 20%, 10% or, optionally 5% of the average intensity across the surface of the plate.

Any of the imaging systems and methods provided herein may further comprise a plurality of light sources in optical communication with the plurality of image capture devices. The plurality of light sources may transmit light to the plurality of image capture devices via transmission or reflectance. The plurality of light sources may be positioned in a pattern surrounding each of the image capture devices. The pattern may comprise at least one light source uniformly positioned from each of the image capture devices or uniformly positioned from each of the individual wells. In cases in which multiple light sources are provided per well or per imaging device, they may form patterns such as equidistant or irregular triangles, squares, hexagons or other shapes around either the well or the imaging device.

The light sources may comprise light emitting diodes. Each of the plurality of light sources may provide an excitation bandwidth of less than or equal to 300 nm (white light LED), less than or equal to 110 nm (wide-band colored LED), less than or equal to 40 nm (typical colored LED), or less than or equal to 10 nm (narrow-band LED). In addition, the plurality of light sources may target a plurality of excitation wavelength ranges that may span from ultraviolet to infrared to provide a multi-channel optical system. The multi-channel optical system may have at least two channels, or optionally, at least four channels. The plurality of light sources may provide an output light intensity that is substantially uniform across the multi-well plate.

Any of the imaging systems provided herein may further comprise one or more optical components, for example illumination lenses having: diffusion surfaces, microarray lenses, refractive lenses, Fresnel lenses or a combination thereof to provide an output light intensity that is substantially uniform across the assay plate. In an embodiment, for example, the multi-well plate comprises an n by m array of wells and the plurality of light sources comprises an (n+1) by (m+1) array of light emitting diodes that overlays the array of wells to provide substantially equal light intensity for each well.

Optical components may be introduced to enhance sensing and/or analysis by providing conditioned light more suitable to various biotech applications. Included herein, is the useful addition of filters, polarizers, anti-reflection features and/or gaskets to provide collimated light and/or reduce the amount of stray light in between the various individual wells in an assay. These optical components may help achieve a desired uniformity of light intensity and spectral characteristics over the entire imaged area.

Any of the provided imaging systems may further comprise an optical gasket having optical passages in optical alignment with each of the image capture devices to block unwanted light from the light sources entering the image capture devices. The optical gasket may also function as a collimating gasket, which blocks and/or absorbs non-collimated light, thereby preventing non-collimated light from reaching the spectral filter(s) and/or optical sensors. The optical gasket may also include an aperture to aid in blocking non-collimated light. In some cases, collimation may be achieved primarily via refractive means, with the gasket functioning primarily to block stray light.

In an embodiment, the imaging system further comprises a collimating gasket positioned in optical communication with the plurality of light sources to prevent substantially non-collimated light from reaching the image capture devices, for example, a collimating gasket having a thickness greater than or equal to 1 cm. In embodiments, the collimating gasket comprises at least one anti-reflection feature. In embodiments, for example, the anti-reflection features are selected from the group consisting of: coatings, interfering materials, absorption materials, anti-reflection grooves, anti-reflection threads and a combination thereof. These components may beneficially reduce stray or scattered light from interacting with adjacent wells or imaging devices. These light aligning features allow for multiple imaging sensors to be placed in close proximity and still accurately image the targeted wells.

In an embodiment, the provided imaging system further comprises an excitation filter in optical communication with the plurality of light sources to filter excitation light with unwanted wavelengths. In embodiments, for example, the excitation filter provides excitation light to the wells having a wavelength selected from the range of 200 nm to 970 nm, a wavelength selected from the range of 400 nm to 700 nm, a wavelength selected from the range of 500 nm to 600 nm, or optionally, selected from the wavelength range of 511 nm to 568 nm, or optionally, selected from the wavelength range of 625 nm to 662 nm. In an embodiment, the provided imaging system further comprises a stray light filter in optical communication with the plurality of light sources having passages in optical alignment with the well to direct light from the light sources into the wells.

In an embodiment, for example, the provided imaging system further comprises: i) a first light gasket positioned between the plurality of image capture devices and the plurality of light sources that prevents light from the light sources from shining directly into the image capture devices; ii) a first lens array positioned between the plurality of image capture devices and the plurality of wells comprising: a plurality of convergent lenses to direct light from the light sources towards the plurality of wells; and a plurality of convergent lenses to focus light into the plurality of optical sensors; iii) an emission filter positioned between the plurality of image capture devices and the plurality wells to filter light with unwanted wavelengths from entering the plurality of image capture devices; iv) a second light gasket positioned between the plurality of image capture devices and the plurality of light sources prevents non-collimated light from entering the emission filter; v) an excitation filter positioned between the plurality of wells and the plurality of light sources to filter light with unwanted wavelengths from entering the plurality of wells; vi) a second lens array positioned between the plurality of image capture devices and the plurality of wells having: a) a plurality of convergent lenses to focus light from the wells into the image capture devices; and b) a plurality of divergent lenses that scatter light from the light sources to create an output light intensity that is substantially uniform in each of the plurality of wells; and vii) a third light gasket positioned between the plurality of image capture devices and the plurality of light sources to minimize stray light. Such a configuration of components beneficially promotes light provided by a source or a plurality of sources to preferentially target a single well or multiple wells and for each well to interact with a single imaging device. This allows for multiple imaging devices to be placed in close proximity without concern of interference from nearby light sources. In an embodiment, the two lens array assemblies are identical.

Also provided herein are plate analyzers, including analyzers comprising any of the imaging systems described herein. For example, a plate analyzer may comprise: i) a receptacle configured to receive a multi-well plate having a plurality of wells; ii) a plurality of image capture devices with each image capture device in optical alignment with an individual well, wherein each of the image capture devices is configured to capture an image of one of the wells; iii) a plurality of light sources in optical communication with the plurality of image capture devices positioned to provide a uniform light intensity across a surface of the multi-well plate; iv) a lens array positioned between the plurality of image capture devices and the plurality wells having: a) a plurality of convergent lenses to focus light from the wells into the image capture devices; and b) a plurality of divergent lenses that scatter light from the light sources to create an output light intensity that is substantially uniform in each of the plurality of wells; wherein imaging system aggregates the plurality of captured digital images to simultaneously generate v) an aggregate image of the multi-well plate that includes each individual well without any moving parts; and an analyzer in communication with the imaging system; wherein the analyzer analyzes the digital images corresponding to each of the wells and characterizes the multi-well plate based on the images.

In embodiments, the provided assay plate analyzer may further comprise the additional features or embodiments, such as excitation wavelength ranges, lenses, gaskets, light sources and/or filters as described herein.

Also provided herein are various methods of using any of the devices described herein, including methods of imaging. For example, provided herein is a method for imaging a multi-well plate comprising the steps of: i) providing a multi-well plate having a plurality of wells; ii) providing a plurality of image capture devices with each image capture device in optical alignment with an individual well; iii) illuminating the plurality of wells with a plurality of light sources; iv) simultaneously generating a digital image with each of the plurality of image capture devices corresponding to each of the plurality of wells thereby generating a plurality of digital images; and aggregating the plurality of images into a plate image corresponding to the multi-well plate.

In embodiments, the provided method may further comprise the additional features, such as excitation wavelength ranges, lenses, gaskets, light sources and/or filters as described herein.

In embodiments, the image capture devices are complementary metal-oxide semiconductor sensors. In an embodiment, for example, the plurality of light sources are light emitting diodes that are uniformly distributed around each of the wells. In embodiments, the illuminating step comprises passing light from the plurality of light sources through a plurality of stacked filters comprising: one or more gaskets, excitation filters, emission filters or lens arrays.

In an embodiment, for example, the plurality of stacked filters comprise: i) a first light gasket positioned between the plurality of image capture devices and the plurality of light sources that prevents light from the light sources shining directly into the image capture devices; ii) an emission filter positioned between the plurality of image capture devices and the plurality wells to filter light with unwanted wavelengths from entering the plurality of image capture devices; iii) a first lens array positioned between the plurality of image capture devices and the plurality wells having: a) a plurality of convergent lenses to direct light from the light sources towards the plurality of wells; and b) a plurality of convergent lenses to direct light into the plurality of image capture devices; iv) a second light gasket positioned between the plurality of image capture devices and the plurality of light sources prevents non-collimated light from entering the emission filter; v) an excitation filter positioned between the plurality of wells and the plurality of light sources to filter light with unwanted wavelengths from entering the plurality of wells; vi) a second lens array positioned between the plurality of image capture devices and the plurality wells having: a) a plurality of convergent lenses to focus light from the wells into the plurality of image capture devices; and b) a plurality of divergent lenses that scatter light from the plurality of light sources to create an output light intensity that is substantially uniform in each of the plurality of wells; and vii) a third light gasket positioned between the plurality of image capture devices and the plurality of light sources to minimize stray light.

In an embodiment, for example, the multi-well plate has up to and including 96 wells and the step of simultaneously generating an image is completed in less than or equal to 2 seconds, or less than or equal to 1 second. In embodiments, the step of aggregating the plurality of images comprises: i) multiplexing the digital images from each of the image capture devices; and ii) aggregating the plurality of digital images and positioning them on a generic background image; wherein each of the digital images is positioned on the generic background image in a geometric position corresponding to a physical location of the individual well imaged by the image capture device.

Representative claims include:

1. An imaging system for a multi-well plate comprising: a receptacle configured to receive a multi-well plate having a plurality of wells; a plurality of image capture devices with each image capture device in optical alignment with an individual well, wherein each of said image capture devices is configured to capture an image of one of said wells; wherein said imaging system aggregates said plurality of captured digital images to simultaneously generate an aggregate image of said multi-well plate that includes each individual well without any moving parts.

2. The imaging system of claim 1, wherein said multi-well plate is an enzyme-linked immunosorbent assay (ELISA) plate, a $TCID_{50}$/mL or $EID_{50}$/mL plate, or a microneutralization plate.

3. The imaging system of any of claims 1-2, wherein said multi-well plate is a 48-well or 96-well plate.

4. The imaging system of any of claims 1-3, wherein said image capture devices are selected from the group consisting of: digital cameras, charge coupled devices, active pixel sensors, complementary metal-oxide semiconductor sensors, N-type metal-oxide semiconductor sensors and a combination thereof.

5. The imaging system of any of claims 1-4, wherein said aggregate image has an aggregate imaged area and said multi-well plate has a well area footprint and an inter-well area footprint; and said aggregate image area is composed of less than 10% of said inter-well area footprint.

6. The imaging system of claim 5, wherein said total aggregate image area is within ±10% of the total well area footprint.

7. The imaging system of claim 5, wherein said well area footprint is greater than or equal to 50% of a total plate footprint.

8. The imaging system of any of claims 1-7 further comprising an analyzer in communication with said imaging system and configured to characterize said aggregate image of said plate.

9. The imaging system of claim 8, wherein said analyzer characterizes an agglutination parameter of an agglutination assay.

10. The imaging system of claim 9, wherein said analyzer characterizes an agglutination parameter selected from the group consisting of: a titer value, concentration, genotype, phenotype, serotype, viral resistance, inhibition, presence of said agglutinating mediator; and absence of said agglutinating mediator.

11. The imaging system of claim 8, wherein said analyzer characterizes a parameter of a fluorescence microarray or a parameter of an absorbance microarray.

12. The imaging system of any of claims 1-11 further comprising a plurality of light sources in optical communication with said plurality of image capture devices.

13. The imaging system of claim 12, wherein said plurality of light sources transmit light to said plurality of image capture devices via transmission or reflectance.

14. The imaging system of claim 12 wherein said plurality of light sources are positioned in a pattern surrounding each of said image capture devices.

15. The imaging system of claim 14, wherein said pattern is comprises at least one light source uniformly aligned around each of said image capture devices.

16. The imaging system of any of claims 12-15, wherein said light sources are light emitting diodes.

17. The imaging system of any of claims 12-16, wherein said plurality of light sources provide an excitation wavelength range of less than or equal to 300 nm.

18. The imaging system of any of claims 12-16, wherein said plurality of light sources provide a plurality of excitation wavelength ranges to provide a multi-channel optical system.

19. The imaging system of claim 18, wherein said multi-channel optical system has at least two channels.

20. The imaging system of any of claims 12-19 wherein said plurality of light sources provide an output light intensity that is substantially uniform across said multi-well plate.

21. The imaging system of any of claims 12-20 further comprising one or more illumination lenses having: diffusion surfaces, microarray lenses, refractive lenses, Fresnel lenses or a combination thereof to provide an output light intensity that is substantially uniform across said assay plate.

22. The imaging system of any of claims 12-21, wherein said multi-well plate comprises an n by m array of wells and said plurality of light sources comprises an (n+1) by (m+1) array of light emitting diodes that overlays the array of wells to provide substantially equal light intensity for each well.

23. The imaging system of any of claims 12-22 further comprising an optical filter having optical passages in optical alignment with each of said image capture devices to block unwanted light from said light sources entering said image capture devices.

24. The imaging system of any of claims 12-23 further comprising a collimating gasket positioned in optical communication with said plurality of light sources to prevent substantially non-collimated light from reaching said image capture devices.

25. The imaging system of claim 24, wherein said collimating gasket has a thickness greater than or equal to 1 cm.

26. The imaging system of claim 24, wherein said collimating gasket comprises at least one anti-reflection feature.

27. The imaging system of claim 26, wherein said anti-reflection features are selected from the group consisting of: coatings, interfering materials, absorption materials, anti-reflection grooves, anti-reflection threads and a combination thereof.

28. The imaging system of any of claims 12-27 further comprising an excitation filter in optical communication with said plurality of light sources to filter excitation light with unwanted wavelengths.

29. The imaging system of claim 28 wherein said excitation filter provides excitation light to said wells having a wavelength selected from the range of 200 nm to 970 nm.

30. The imaging system of any of claims 12-29 further comprising a stray light filter in optical communication with said plurality of light sources having passages in optical alignment with said well to direct light from said light sources into said wells.

31. The imaging system of any of claims 12-30 further comprising: a first light gasket positioned between said plurality of image capture devices and said plurality of light sources that prevents light from said light sources shining directly into said image capture devices; a first lens array positioned between said plurality of image capture devices and said plurality of wells comprising: a plurality of convergent lenses to direct light from said light sources toward the plurality of wells; a plurality of convergent lenses to focus light into the plurality of optical sensors; an emission filter positioned between said plurality of image capture devices and said plurality of wells to filter light with unwanted wavelengths from entering said plurality of image capture devices; a second light gasket positioned between said plurality of image capture devices and said plurality of light sources prevents non-collimated light from entering said emission filter; an excitation filter positioned between said plurality of wells and said plurality of light sources to filter light with unwanted wavelengths from entering said plurality of wells; a second lens array positioned between said plurality of image capture devices and said plurality wells having: a plurality of convergent lenses to focus light from said wells into said plurality of image capture devices; and a plurality of divergent lenses that scatter light from said light sources to create an output light intensity that is substantially uniform in each of said plurality of wells; a third light gasket positioned between said plurality of image capture devices and said plurality of light sources to minimize stray light.

32. An assay plate analyzer comprising: an imaging system for an assay plate comprising: a receptacle configured to receive a multi-well plate having a plurality of wells; a plurality of image capture devices with each image capture device in optical alignment with an individual well, wherein each of said image capture devices is configured to capture an image of one of said wells; a plurality of light sources in optical communication with said plurality of image capture devices positioned to provide a uniform light intensity across a surface of said multi-well plate; a lens array positioned between said plurality of image capture devices and said plurality of light sources comprising: a plurality of convergent lenses to direct light from said light sources toward the plurality of wells; a plurality of convergent lenses to focus light into the plurality of optical sensors; wherein imaging system aggregates said plurality of captured digital images to simultaneously generate an aggregate image of said multi-well plate that includes each individual well without any moving parts; and an analyzer in communication with said imaging system; wherein said analyzer analyzes said digital images corresponding to each of said wells and characterizes said multi-well plate based on said images.

33. A method for imaging a multi-well plate comprising the steps of: providing a multi-well plate having a plurality of wells; providing a plurality of image capture devices with each image capture device in optical alignment with an individual well; illuminating said plurality of wells with a plurality of light sources; simultaneously generating a digital image with each of said plurality of image capture devices corresponding to each of said plurality of wells thereby generating a plurality of digital images; and aggregating said plurality of images into a plate image corresponding to said multi-well plate.

34. The method of claim 33, wherein said image capture devices are complementary metal-oxide semiconductor sensors.

35. The method of any of claim 33 or 34, wherein said plurality of light sources are light emitting diodes that are uniformly distributed around each of said wells.

36. The method of any of claims 33-35, wherein said illuminating step comprises passing light from said plurality of light sources through a plurality of stacked filters comprising: one or more gaskets, excitation filters, emission filters or lens arrays.

37. The method of claim 36 wherein said plurality of stacked filters comprise: a first light gasket positioned between said plurality of image capture devices and said plurality of light sources that prevents light from said light sources shining directly into said image capture devices; an emission filter positioned between said plurality of image capture devices and said plurality wells to filter light with unwanted wavelengths from entering said plurality of image capture devices; a first lens array positioned between the plurality of image capture devices and the plurality of wells having: a plurality of convergent lenses to direct light from said light sources towards said plurality of wells; a plurality of convergent lenses to direct light to said plurality of image capture devices; a second light gasket positioned between said plurality of image capture devices and said plurality of light sources prevents non-collimated light from entering said emission filter; an excitation filter positioned between said plurality of wells and said plurality of light sources to filter light with unwanted wavelengths from entering said plurality of wells; a second lens array positioned between said plurality of image capture devices and said plurality wells having: a plurality of convergent lenses to focus light from said wells into said plurality of image capture devices; and a plurality of divergent lenses that scatter light from said plurality of light sources to create an output light intensity that is substantially uniform in each of said plurality of wells; and a third light gasket positioned between said plurality of image capture devices and said plurality of light sources to minimize stray light.

38. The method of any of claims 33-37, wherein said multi-well plate has up to and including 96 wells and said step of simultaneously generating an image is completed in less than or equal to 2 seconds.

39. The method of any of claims 33-38, wherein said step of aggregating said plurality of images comprises: multiplexing said digital images from each of said image capture devices; and aggregating said plurality of digital images and positioning them on a generic background image; wherein each of said digital images is positioned on said generic background image in a geometric position corresponding to a physical location of said individual well imaged by said image capture device.

BRIEF DESCRIPTION OF THE DRAWINGS

FIG. 4 illustrates example configurations for different number of channel systems.

DETAILED DESCRIPTION OF THE INVENTION

Figure 1:
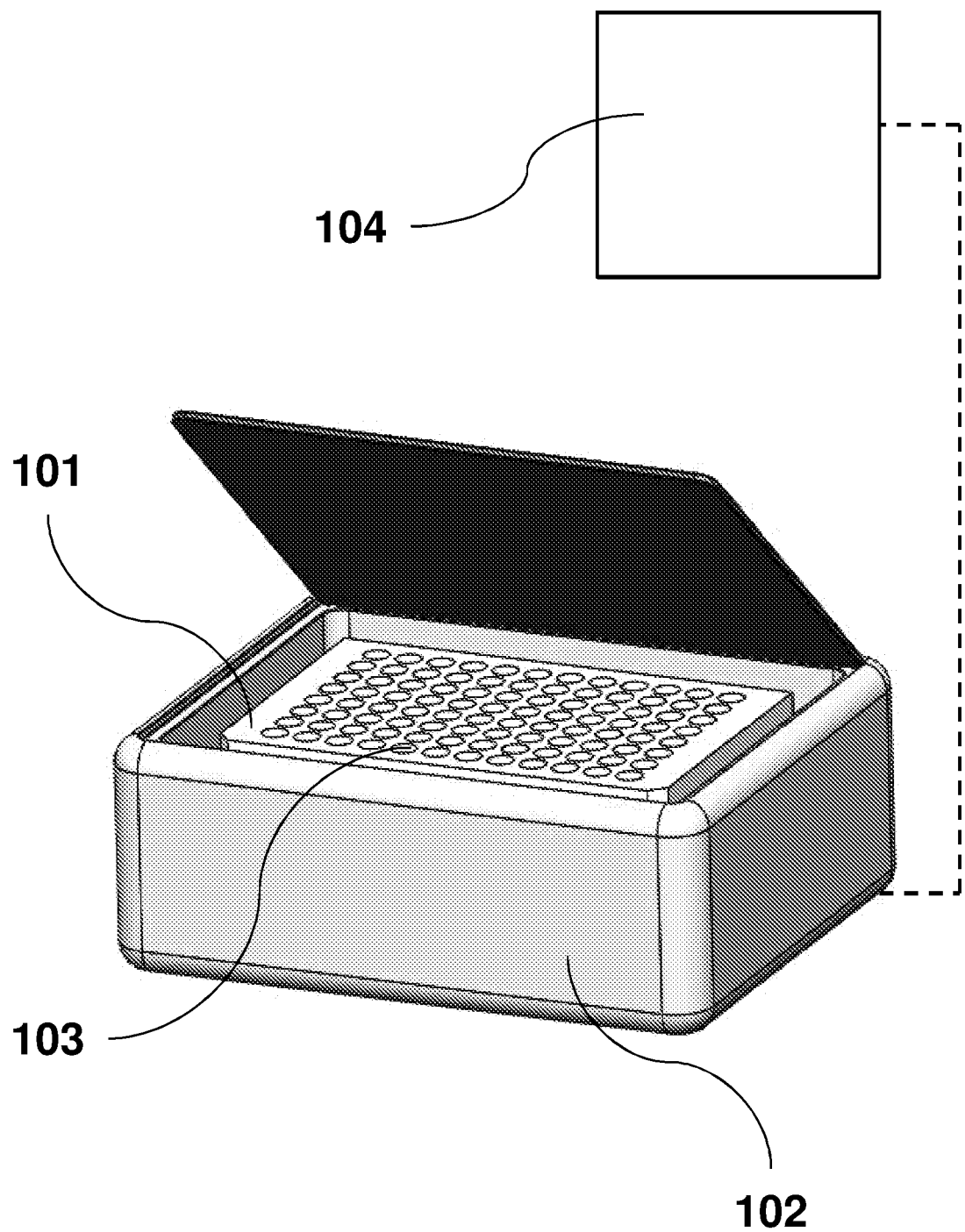
FIG. 1 provides an example of a parallel imaging system demonstrative of the reduced device size provided by the multiple optical sensors.

In general, the terms and phrases used herein have their art-recognized meaning, which can be found by reference to standard texts, journal references and contexts known to those skilled in the art. The following definitions are provided to clarify their specific use in the context of the invention.

As used herein, "Multi-well plate" refers to a substantially flat plate with a plurality of wells which are useful in biotech analysis techniques. Multi-well plates may contain wells of various volumes or configurations. In embodiments, for example, multi-well plate may refer to plates having 12, 24, 48 or 96 wells. Multi-well plate may, in some embodiments, refer to a flat plate wherein the plurality of wells are discrete areas on the surface, for example, separated by a physical means such as a gasket or by a distance such that the wells do not overlap with no physical separation between wells.

As used herein, "Assay" refers to a method for determining biological characteristics. The various steps of an assay may make use of multi-well plates or arrays of other elements to be imaged or analyzed. In an embodiment, an assay makes use of a substantially flat plate with a plurality of wells which are useful in analysis techniques. Assays may utilize wells of various volumes or configurations.

As used herein, "array" refers to a plurality of elements that can be used in an assay and imaged individually or individually optically addressed. In an embodiment, an array may comprise a plurality of wells in a multi-well plate.

As used herein, "microarray" refers to a plurality of biological molecules printed on a substrate in discrete locations that can be used in an assay. In an embodiment, a microarray can be printed in the well of a multi-well plate or in an array of discrete areas on an alternative substrate for downstream analysis.

"Image capture device," "optical sensors" and "camera" are used synonymously to refer to any device capable of optical measurements. In embodiments, image capture device may refer to digital cameras, charge coupled devices, active pixel sensors, complementary metal-oxide semiconductor sensors, N-type metal-oxide semiconductor sensors and a combination thereof.

"Aggregate image" refers to a combination of outputs of the plurality of image capture devices described herein. Aggregate image may refer to a single digital image generated from a combination of each of the image capture devices. In embodiments, the aggregated image is a digital image compiled by an electronic device, such as a processor.

"Well area footprint" refers to the two dimensional area of a multi-well plate corresponding to each individual well. In an embodiment, well area footprint may refer to areas containing biological reagents, such as liquid reagents, of interest in sensing, imaging or analysis.

"Inter-well area footprint" refers to the two dimensional area of a multi-well plate not corresponding to the well area footprint. In an embodiment, inter-well area footprint refers to the area between the individual wells which is typically not of interest in sensing, imaging or analysis.

"Excitation light" refers to light useful in biological sensing or analysis, for example, by initiating fluorescence in a biological sample. Excitation wavelength ranges as provided herein, refers to light substantially within the referenced range, for example, 90% of provided light has a wavelength within the referenced range, 95% of provided light has a wavelength within the referenced range, or optionally, 99% of provided light has a wavelength within the referenced range.

Unless described otherwise, "substantially" refers to a value which falls within plus or minus 20%, 10% or, optionally 5% of a referenced value, average or range.

"Uniformly" or "Uniformly aligned" refers to multiples of like components being equally positioned in reference to a corresponding component. For example, imaging devices may be uniformly aligned with corresponding plate wells, meaning that each image device is equally positioned (e.g.

distance, offset, etc.) from one corresponding well. Uniformly may also refers to situations in which multiple components are provided for each corresponding component. For example, multiple light sources may be provided for each well, wherein each well has an identical distribution of light sources around it such as in a pattern.

"Simultaneously" refers to multiple events or processes occurring in close temporal proximity. Simultaneous may refer to events occurring within a 5 second period, within a 2 second period or within a one second period. For example, simultaneous images may refer to a group of images taken within a 5 second period.

"Optical communication" refers to two or more points or components which are positioned to allow the transfer of light between them.

"Optical alignment" refers to two or more components in optical communication allowing for the transfer of a majority of light from the first component to the second or vice versa. For example, optical alignment may allow for 10% of light, 50% of light, 75% of light or, optionally 90% of light from a first component to be directed towards the second component. In embodiments, optical alignment refers to components or points in optical communication which are uniformly aligned.

"Collimated light" refers to a beam of electromagnetic radiation where the rays or photons travel in a substantially parallel direction resulting in low beam divergence. Collimated light may refer to light in which 80% of the light travels within 10° of the axial direction, 90% of the light travels within 10° of the axial direction or, optionally, 95% of the light travels within 10° of the axial direction. Collimated light may refer to light which has a divergence of less than or equal 50 mRad, less than or equal to 10 mRad, or less than or equal to 2.5 mRad.

Example—Parallel Imaging System

The provided systems and methods enable multiple images of a multi-well plate, for example, a 96-well assay plate common to the biotech industry (FIG. 1), to be taken simultaneously in parallel. FIG. 1 provides a receptacle containing a multi-well plate 101 with multiple wells 103. All 96 wells can be illuminated and imaged simultaneously with no moving parts. Each sensor images a single well, so the optics can be optimized to make full usage of the sensor's resolution allowing for minimal imaging of the space between wells. The well is placed in a receptacle in which the light sources are provided in the bottom. The receptacle 102 may optionally include or be connected to an analyzer 104 for processing or analyzing the images.

Currently, obtaining a high-resolution image of each well typically requires sequential imaging of each well, with the imaging system or plate moved between each image. This process is time-consuming and requires moving parts. Much of the size, cost, and power requirement of a sequential imaging system are due to the mechanical actuators required to move the plate or the image sensor. A parallel imaging system eliminates the need for actuators, thereby achieving a smaller, more efficient and potentially less-expensive system. Reducing the power requirement makes the instrument more conducive for use as a battery-powered device. The ability to be battery-powered facilitates the use of the device in remote locations, field hospitals, and monitoring stations, and by emergency response personnel, for example in the case of a biological outbreak. Further, eliminating moving parts improves ruggedness and reliability, and reduces the potential for misalignment of the sensor and the wells being imaged.

The provided system and methods also have advantages over a system which takes a single image of the entire plate. In a single-image system, much of the resolution of the sensor is wasted in imaging the space between the wells. Additionally, in the image of a single-image system the view of different wells on the same plate is not equivalent, since the distance and angle relative to the optical sensor varies across the plate. In contrast, parallel imaging provides an image for every well with equivalent angles and distance.

Figure 2A:
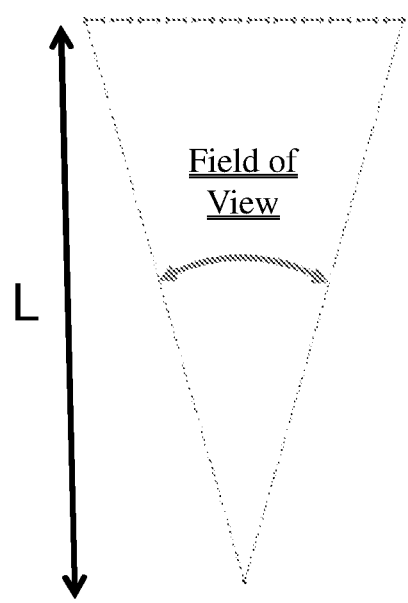
FIGS. 2A and 2B illustrates reduced working distance associated with a parallel sensor system of twelve separate sensors (FIG. 2B), as compared to that of a single optical sensor system (FIG. 2A).
Figure 2B:
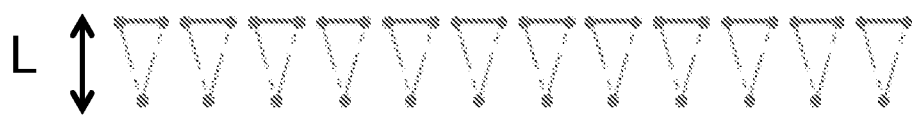

A single-image system is only suitable for imaging from below the wells, since the optical sensor does not have line of sight to the bottom of wells when imaging from above. The provided parallel imaging system is compatible for either above or below well imaging. In order to image all wells with a single image, the optical sensor is located far from the plate to ensure all wells are captured. With parallel imaging, in contrast, each optical sensor can be located in closer proximity to the wells, resulting in a smaller instrument, as illustrated in FIG. 2. The separation distance, L, defined as the distance from the optical sensor to the nearest point of the well is also shown, illustrating the reduced separation distance of a parallel system.

A parallel imaging system may also provide advantages for high throughput use. A parallel imaging system is faster than a sequential system, since images can be taken simultaneously of all the wells of a multi-well plate, and movement time is eliminated. By virtue of the reduced size of a parallel system, the system can be located directly on the deck of a liquid-handling robot. The ability to locate the instrument directly on the deck allows more users to incorporate the instrument into their lab and workflow, since neither hardware modification nor additional robotic handling is required.

Sensovation's™ Flair™ plate imaging system is an example of a sequentially-imaging plate reader. Several minutes are required to image an entire 96-well plate.

Figure 3:
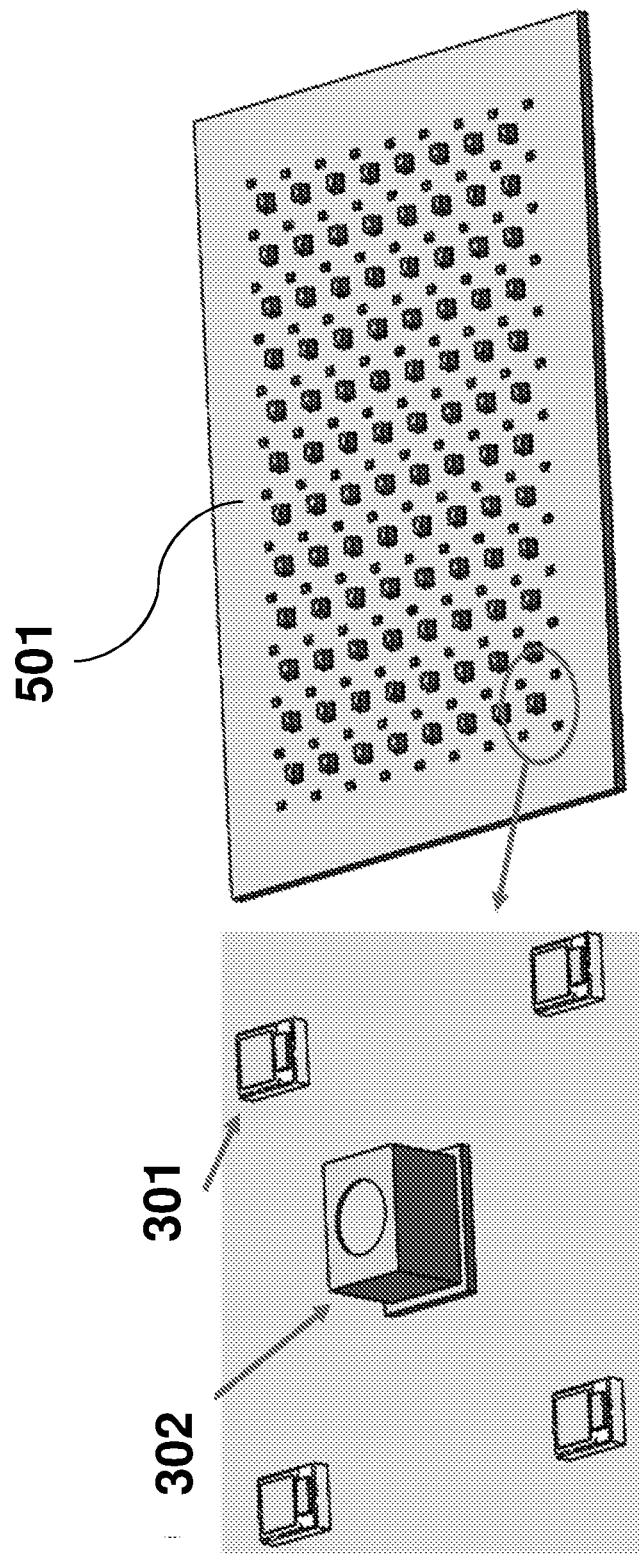
FIG. 3 provides an example of a printed circuit board with both optical sensors or cameras and light sources, such as light emitting diodes.
Figure 4A:
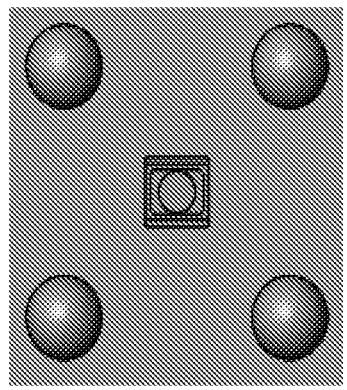
FIG. 4A shows a single channel system with four light sources per well.
Figure 4B:
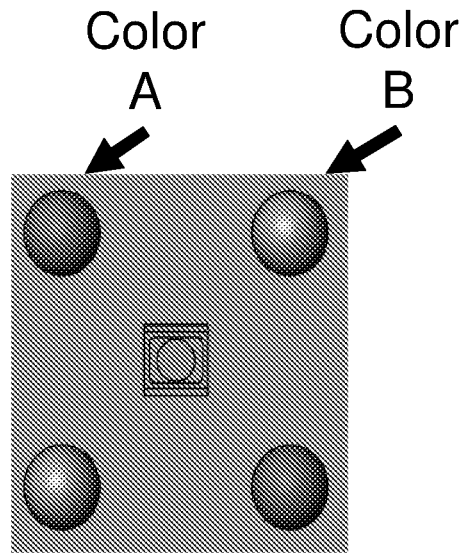
FIG. 4B shows a two channel system with four light sources per well.
Figure 4C:
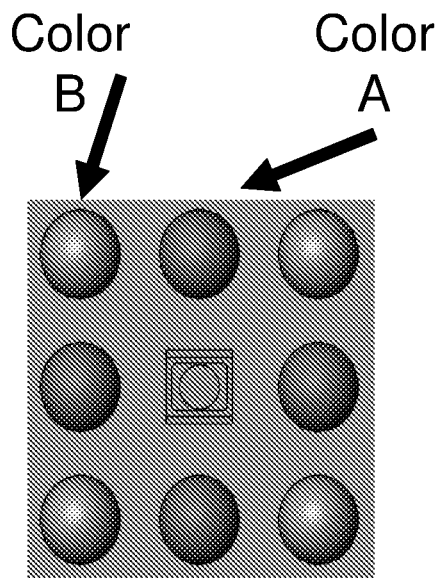
FIG. 4C shows a two channel system with eight light sources per well.
Figure 4D:
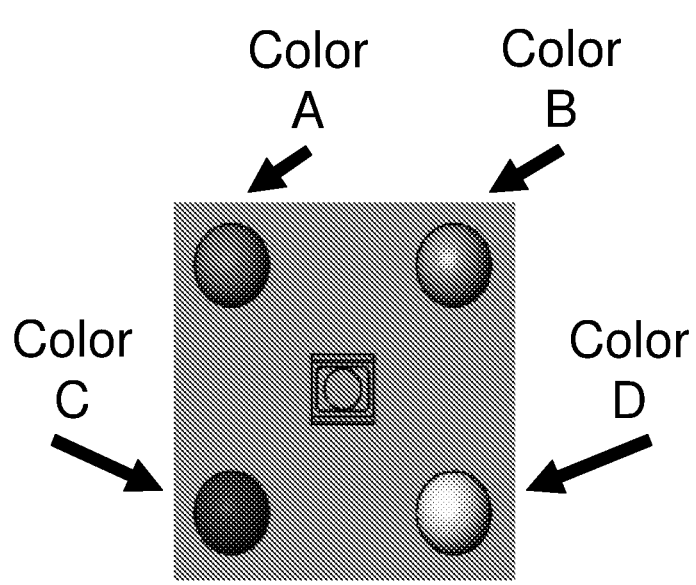
FIG. 4D shows a four channel system with four light sources per well.
Figure 5:
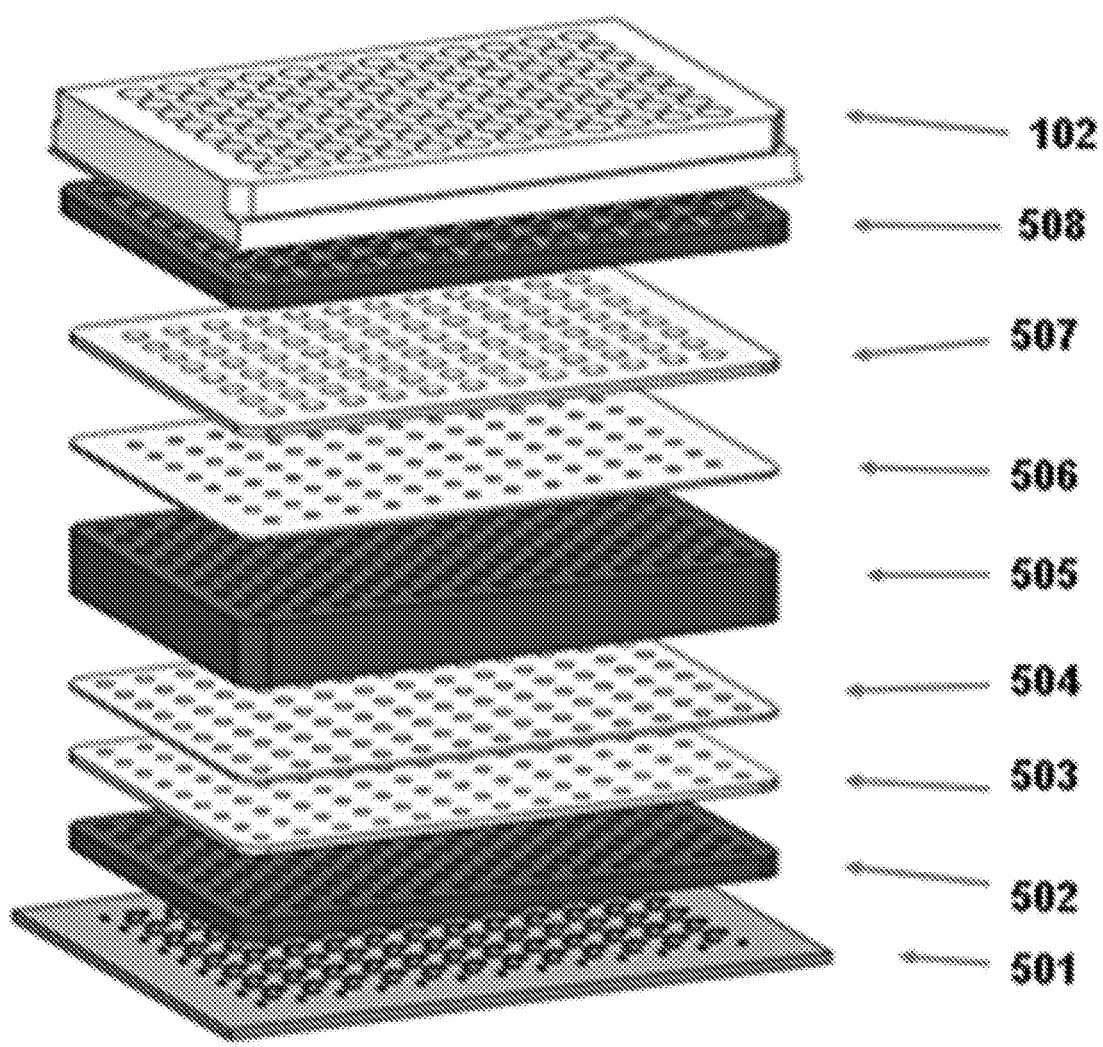
FIG. 5 provides an example configuration of a parallel imaging system including additional optical components.

In an example parallel imaging system, a single printed circuit board assembly 501 (PCBA) contains an array of optical sensors 302, one for each well to be imaged in the 8×12 pattern of the wells, and an overlaying 9×13 pattern of light sources 301 (e.g. LEDs) (FIGS. 3 and 5). Luxeon™ Z LEDs and OmniVision™ OVM7690 cameras shown to scale for reference.

The pattern of LEDs ensures that each well is illuminated by 4 LEDs to ensure equal and uniform illumination of all wells. Illumination by one, two, three, or other numbers of LEDs per well is also possible. Multiple patterns of 4 (or other numbers) of LED's may be located around each well. Additionally, other patterns such as a triangle, pentagon, hexagon or octagon of LEDs around each individual well may be used to provide uniform illumination.

LEDs of different wavelengths may be incorporated into a single system, in order to achieve a multi-channel fluorescence system. FIG. 4 provides examples of possible LED configurations. Multi-passband filters can be used without the need for moving filter wheels.

Alternatively, a customizable or configurable single-channel system is possible. Broad-spectrum LEDs (white light) can be implemented in order to use the same imaging circuit board for each version. Application-specific filter pairs can be installed in order to perform fluorescence imaging with different dyes. This customization may be performed during manufacturing. The system may be designed to have user-exchangeable filters, in order to use the same instrument for different applications. The system may also be used to perform transmission-based imaging or colorimetric analysis, by using white light LEDs and eliminating filters.

FIG. 5 provides an example of a parallel imaging system with optional components which may provide additional utility or accuracy. A printed circuit board assembly 501 comprising a plurality of image capture devices and light sources, for example, board-mounted cameras and an LED array (e.g. 8×12 cameras and 9×13 LEDS) forms the bottom layer. It is separated from a lens array 503 by a light gasket 502. The molded lens array may have lenses such that the bottom is convergent and the top is divergent. Above the lens array is an emission filter 504 followed by a collimating light gasket 505. Above the collimating light gasket rests an excitation filter 506 and an additional molded lens array 507, in this case top convergent and bottom divergent. Then another light gasket 508 is positioned between the second lens array and the well plate 102.

Figure 6:
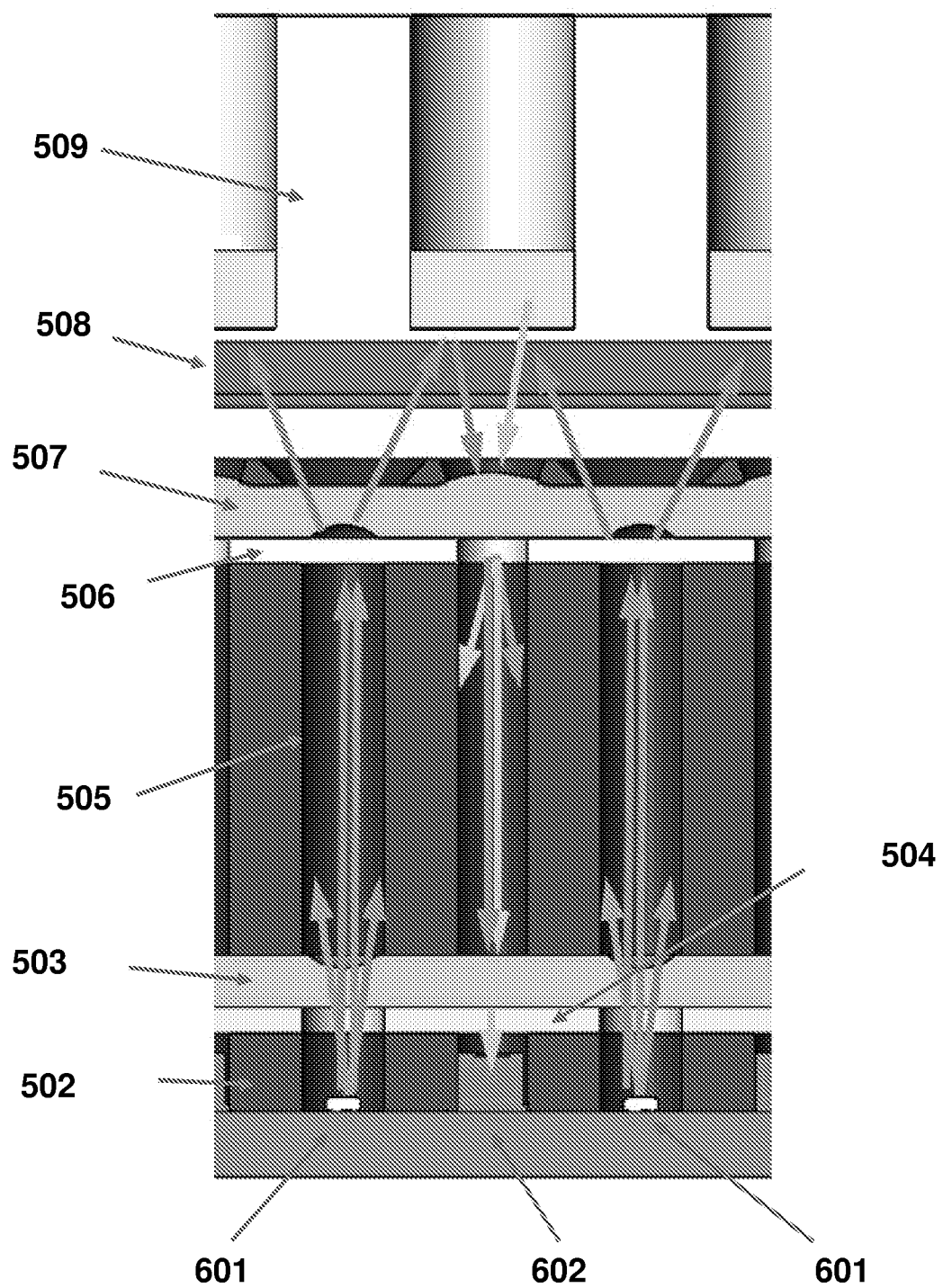
FIG. 6 provides a cross-sectional view of an example configuration of a parallel imaging system, of a fluorescence design, including additional optical components, with colored arrows describing functionality of components.

FIG. 6 provides a cross-sectional view of an example configuration of a parallel imaging system, of a fluorescence design, including additional optical components, with arrows describing functionality of components. Light, which is non-collimated and of a spectrum which exceeds the target spectrum of the application, is depicted as radiating from the light sources (e.g. LED's) 601. Light from the light sources is directed by the upper lens array 507 toward the well plate 102. Only collimated light passes through the collimating gasket 505. Only light matching the target spectrum passes through the excitation filter 506. The upper lens array 507 projects illumination light onto the target wells within the well plate 102. Light, which is non-collimated and of a spectrum which exceeds the target spectrum of the application, is depicted as radiating from the wells. The upper lens array 507 directs the emission light toward the imaging device. Only collimated light passes through the collimating gasket 505. The emission light is directed toward the imaging device by the lower lens array 503. Only light matching the target spectrum passes through the emission filter 504.

A first light gasket 502 fits over the circuit board with holes for each of the sensors and each of the LEDs. The light gasket 502 is made of a light-absorbing material and prevents light from the LEDs from shining directly on the sensors.

A lens array directs the light from the LEDs 601 towards the multi-well plate. An emission filter 504 ensures that only the light of the desired wavelength band returns to the sensors. This is useful for fluorescence imaging. The filter can be a plate with an array of holes cut over the LEDs (9×13) on the circuit board/first light gasket to allow the LED light to pass through, or a solid plate which does not have filter coatings at the locations coincident with the LEDs.

A second light gasket 505 has a substantial thickness to ensure that only light that is sufficiently collimated is passed. This helps to collimate both the excitation light from the LEDs and the returning emission light. Collimated light may be required for proper filter performance. Systems which require collimated light typically rely on refractive optics to redirect high-angle light. The parallel imaging design has an advantage over a conventional system, in that refractive optics are not required for collimation. Since each well has a dedicated LED array, which is located very close to the well, adequate collimated illumination can be achieved by simple, mechanical means. Rather than redirecting light, the light gasket simply blocks high angle light. The portion of light which is naturally collimated passes through to the well, with all other light being blocked by the gasket. A refractive lens array may be used in conjunction with the collimating gasket, depending on the specific performance targets of the system.

As with the first light gasket, there are holes for both the sensors and LEDs. The internal surface of the holes through which the light passes may incorporate anti-reflection features to prevent non-collimated light from traveling through the holes by way of reflection(s). Anti-reflection (AR) features may include coatings and/or materials which function via interference or absorption. Anti-reflection grooves or threads may also be used.

An excitation filter 506 ensures that only the exciting light from the LEDs of the desired wavelength band is passed through to the wells. An array of holes (8×12) allows the emission light to pass through unencumbered.

A molded lens array 507 provides the optical characteristics to guide light in both directions. On the top surface (shown) are 8×12 convergent lenses that focus the emission light onto each of the sensors. On the bottom surface (not shown) are 9×13 divergent lenses that spread the light from each of the LEDs to provide uniform illumination of each well. The illumination lenses may incorporate features to improve uniformity, such as diffusion surfaces, a microlens array or Fresnel lenses.

Figure 7:
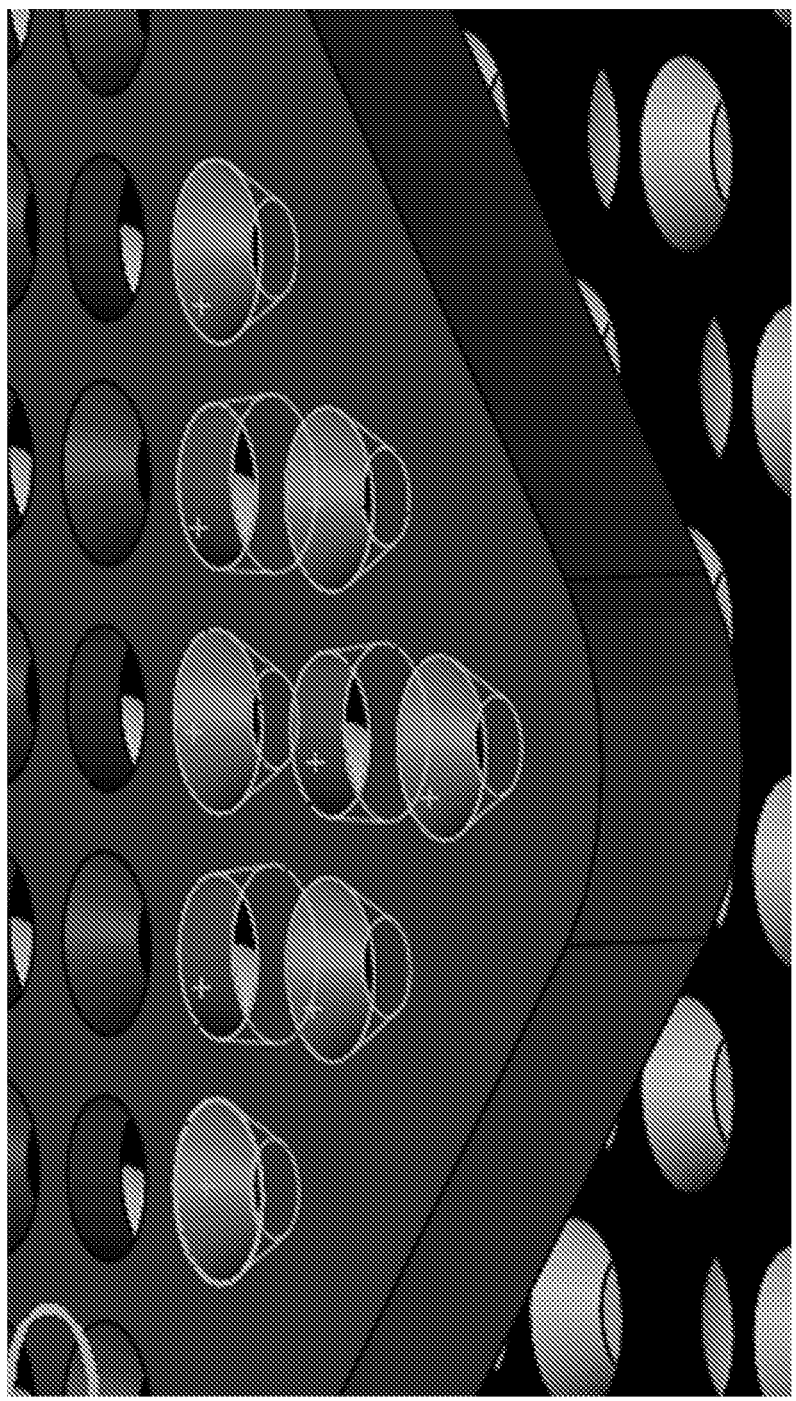
FIG. 7 provides an example of a light gasket which may be employed in the present invention.

A third light gasket 508 fits over the lens array and helps to minimize stray light (see also, FIG. 7). There are holes for each of the LEDs and each of the sensors. The holes can be shaped to match the light guiding angles of the lenses.

Figure 8:
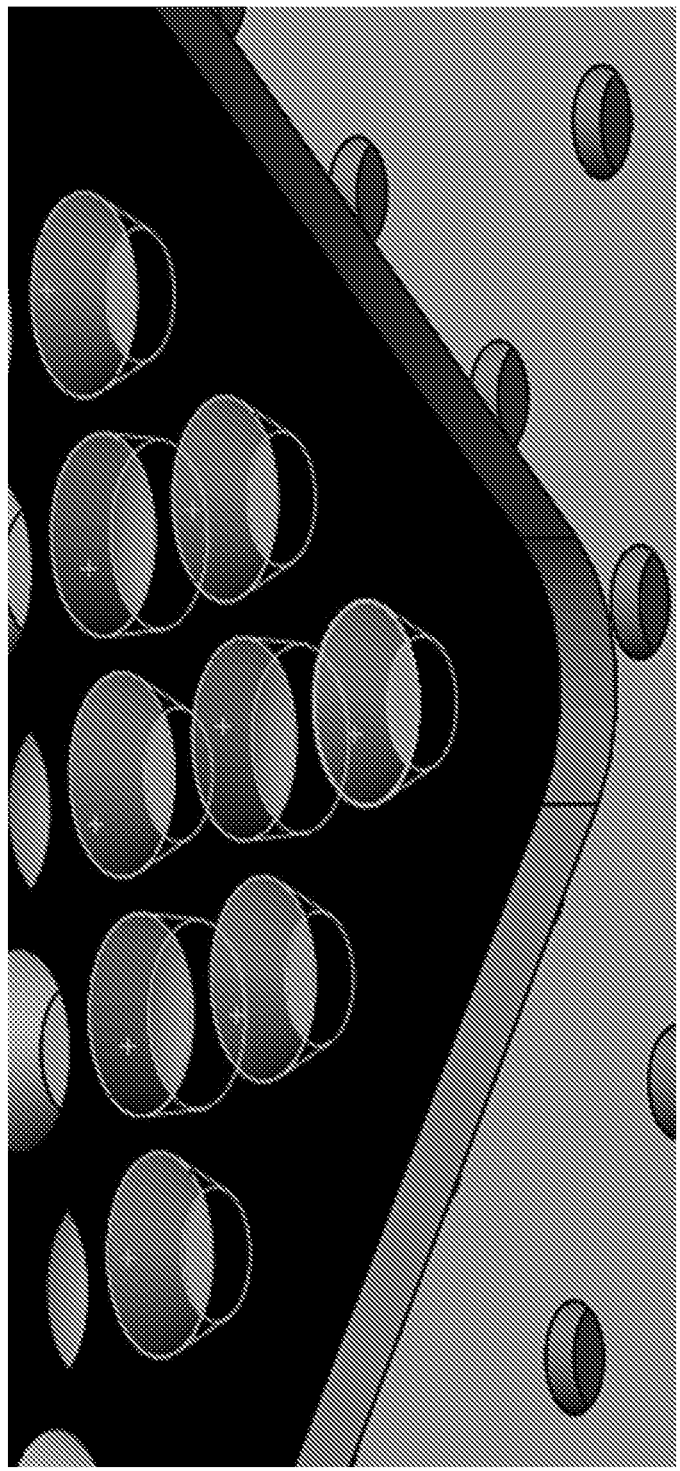
FIG. 8 provides an example of a second light gasket which may be employed in the present invention, for example, in conjunction with the gasket provided in FIG. 6.

The lens array and adjacent light gasket may be made in a twin-shot molding process with the gasket overmolded to both minimize stray light and protect the lens surfaces from damage during handling and assembly (FIG. 8). The holes in the overmolded gasket can be shaped to match the optics of the lenses. The described assembly directs light back into the image capture devices 302, allowing for capture and analysis.

Custom electronic components may be required to control both the imaging and illumination aspects of the system. In order to independently control all of the sensors in the array and simultaneously capture image data, it is necessary to employ high-speed hardware. This may be implemented using a programmable logic device such as an FPGA (field-programmable gate array). This approach provides a flexible and cost-effective solution, allowing a large number of images to be collected and processed in parallel providing close to real-time results. A microcontroller, either embedded in the FPGA or contained in a separate IC, may be used to control LED drivers, communicate with user interface components and interface with any other sensors or devices required for instrumentation.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Specific names of compounds or components are intended to be exemplary, as it is known that one of ordinary skill in the art can name the same compounds or components differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a number range, an area rage, a size range or a wavelength range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:
1. An imaging system for a multi-well plate comprising:
   a receptacle configured to receive a multi-well plate having a plurality of wells;
   a plurality of image capture devices with each image capture device in optical alignment with an individual well, wherein each of said image capture devices is configured to capture an image of one of said wells;
   a plurality of light sources in optical communication with said plurality of image capture devices;
   a first light gasket positioned between said plurality of image capture devices and said plurality of light sources that prevents light from said light sources shining directly into said image capture devices;
   a first lens array positioned between said plurality of image capture devices and said plurality of wells comprising:
      a plurality of convergent lenses to direct light from said plurality of light sources toward the plurality of wells;
      a plurality of convergent lenses to focus light into the plurality of image capture devices;
   an emission filter positioned between said plurality of image capture devices and said plurality of wells to filter light with unwanted wavelengths from entering said plurality of image capture devices;
   a second light gasket positioned between said plurality of image capture devices and said plurality of light sources that prevents non-collimated light from entering said emission filter;

an excitation filter positioned between said plurality of wells and said plurality of light sources to filter light with unwanted wavelengths from entering said plurality of wells;
a second lens array positioned between said plurality of image capture devices and said plurality of wells comprising:
a plurality of convergent lenses to focus light from said wells into said plurality of image capture devices; and
a plurality of divergent lenses that scatter light from said light sources to create an output light intensity that is substantially uniform in each of said plurality of wells;
a third light gasket positioned between said plurality of image capture devices and said plurality of light sources to minimize stray light;
wherein said imaging system aggregates said plurality of captured digital images to simultaneously generate an aggregate image of said multi-well plate that includes each individual well without any moving parts.

2. The imaging system of claim 1, wherein said multi-well plate is an enzyme-linked immunosorbent assay (ELISA) plate, a $TCID_{50}$/mL or $EID_{50}$/mL plate, or a microneutralization plate.

3. The imaging system of claim 1 further comprising an analyzer in communication with said imaging system and configured to characterize said aggregate image of said plate.

4. The imaging system of claim 3, wherein said analyzer characterizes an agglutination parameter of an agglutination assay, wherein said agglutination parameter is selected from the group consisting of: a titer value, concentration, genotype, phenotype, serotype, viral resistance, inhibition, presence of an agglutinating mediator; and absence of said agglutinating mediator.

5. The imaging system of claim 3, wherein said analyzer characterizes a parameter of a fluorescence microarray or a parameter of an absorbance microarray.

6. The imaging system of claim 1, wherein said plurality of light sources are positioned in a pattern surrounding each of said image capture devices, wherein said pattern comprises at least one light source uniformly aligned around each of said image capture devices.

7. The imaging system of claim 1, wherein said plurality of light sources provide a plurality of excitation wavelength ranges to provide a multi-channel optical system.

8. The imaging system of claim 1, further comprising one or more illumination lenses having: diffusion surfaces, microarray lenses, refractive lenses, Fresnel lenses or a combination thereof to provide an output light intensity that is substantially uniform across said multi-well plate.

9. The imaging system of claim 1, wherein said multi-well plate comprises an n by m array of wells and said plurality of light sources comprises an (n+1) by (m+1) array of light emitting diodes that overlays the array of wells to provide substantially equal light intensity for each well.

10. The imaging system of claim 1, further comprising an optical filter having optical passages in optical alignment with each of said image capture devices to block unwanted light from said light sources entering said image capture devices.

11. The imaging system of claim 1, further comprising a collimating gasket positioned in optical communication with said plurality of light sources to prevent substantially non-collimated light from reaching said image capture devices.

12. The imaging system of claim 11, wherein said collimating gasket comprises at least one anti-reflection feature selected from the group consisting of: coatings, interfering materials, absorption materials, anti-reflection grooves, anti-reflection threads and a combination thereof.

13. The imaging system of claim 1, wherein said excitation filter provides excitation light to said wells having a wavelength selected from the range of 200 nm to 970 nm.

14. The imaging system of claim 1, further comprising a stray light filter in optical communication with said plurality of light sources having passages in optical alignment with said well to direct light from said light sources into said wells.

15. A method for imaging a multi-well plate comprising the steps of:
providing a multi-well plate having a plurality of wells;
providing a plurality of image capture devices with each image capture device in optical alignment with an individual well;
illuminating said plurality of wells with a plurality of light sources by passing light from said plurality of light sources through a plurality of stacked filters;
simultaneously generating a digital image with each of said plurality of image capture devices corresponding to each of said plurality of wells thereby generating a plurality of digital images; and
aggregating said plurality of images into a plate image corresponding to said multi-well plate;
wherein said plurality of stacked filters comprise:
a first light gasket positioned between said plurality of image capture devices and said plurality of light sources that prevents light from said light sources shining directly into said image capture devices;
an emission filter positioned between said plurality of image capture devices and said plurality wells to filter light with unwanted wavelengths from entering said plurality of image capture devices;
a first lens array positioned between the plurality of image capture devices and the plurality of wells having:
a plurality of convergent lenses to direct light from said light sources towards said plurality of wells;
a plurality of convergent lenses to direct light to said plurality of image capture devices;
a second light gasket positioned between said plurality of image capture devices and said plurality of light sources prevents non-collimated light from entering said emission filter;
an excitation filter positioned between said plurality of wells and said plurality of light sources to filter light with unwanted wavelengths from entering said plurality of wells;
a second lens array positioned between said plurality of image capture devices and said plurality wells comprising:
a plurality of convergent lenses to focus light from said wells into said plurality of image capture devices;
a plurality of divergent lenses that scatter light from said plurality of light sources to create an output light intensity that is substantially uniform in each of said plurality of wells; and
a third light gasket positioned between said plurality of image capture devices and said plurality of light sources to minimize stray light.

16. The method of claim 15 wherein said plurality of light sources are light emitting diodes that are uniformly distributed around each of said wells.

17. The method of claim 15, wherein said multi-well plate has up to and including 96 wells and said step of simultaneously generating an image is completed in less than or equal to 2 seconds.

18. The method of claim 15, wherein said step of aggregating said plurality of images comprises:
multiplexing said digital images from each of said image capture devices; and
aggregating said plurality of digital images and positioning them on a generic background image;
wherein each of said digital images is positioned on said generic background image in a geometric position corresponding to a physical location of said individual well imaged by said image capture device.

* * * * *